United States Patent
Foster et al.

(10) Patent No.: US 10,037,484 B2
(45) Date of Patent: Jul. 31, 2018

(54) SYSTEM AND METHOD FOR TRACKING AGRICULTURAL PRODUCT UNITS

(71) Applicant: CNH Industrial America LLC, New Holland, PA (US)

(72) Inventors: Christopher A. Foster, Mohnton, PA (US); Douglas S. Fitzkee, Ephrata, PA (US); John H. Posselius, Ephrata, PA (US); Edward H. Priepke, Lancaster, PA (US); Justin R. Ringwald, Chase, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/693,736

(22) Filed: Apr. 22, 2015

(65) Prior Publication Data

US 2015/0310323 A1 Oct. 29, 2015

Related U.S. Application Data

(60) Provisional application No. 61/983,376, filed on Apr. 23, 2014.

(51) Int. Cl.
*G06K 19/06* (2006.01)
*G06Q 50/02* (2012.01)
*A01F 15/08* (2006.01)

(52) U.S. Cl.
CPC ........ *G06K 19/06196* (2013.01); *A01F 15/08* (2013.01); *G06Q 50/02* (2013.01)

(58) Field of Classification Search
CPC .... G06K 19/06196; G06Q 50/02; A01F 15/08

USPC ................. 111/7.2; 56/341; 235/492; 29/432
See application file for complete search history.

(56) References Cited

U.S. PATENT DOCUMENTS

| | | | | | |
|---|---|---|---|---|---|
| 1,646,039 | A | * | 10/1927 | Murton | ................. E04H 17/263 173/126 |
| 5,148,641 | A | * | 9/1992 | Rushing | ................. G01C 15/04 52/103 |
| 5,825,298 | A | * | 10/1998 | Walter | ................... G01C 15/04 324/329 |
| 6,202,315 | B1 | * | 3/2001 | Schmick, Jr. | .......... G01C 15/04 116/209 |
| 6,370,852 | B1 | * | 4/2002 | Ohlemeyer | ............. A01F 15/08 100/41 |

(Continued)

FOREIGN PATENT DOCUMENTS

| | | |
|---|---|---|
| FR | 2931578 A1 | 11/2009 |
| WO | 2009088347 A1 | 7/2009 |
| WO | 2010052375 A1 | 5/2010 |

*Primary Examiner* — Michael Collins
(74) *Attorney, Agent, or Firm* — Rebecca L. Henkel; Rickard K. DeMille

(57) ABSTRACT

A system for tracking a harvested agricultural product unit includes a magazine configured to be disposed on an agricultural implement and to facilitate insertion of one or more stakes into the harvested agricultural product unit. The magazine is also configured to store the one or more stakes having a radio frequency identification (RFID) tag. The RFID tag is configured to identify the harvested agricultural product unit and to associate the harvested agricultural product unit with harvesting data. Further, the system includes an insertion device configured to insert one of the stakes from the magazine into the harvested agricultural product unit.

8 Claims, 4 Drawing Sheets

(56) References Cited

U.S. PATENT DOCUMENTS

| | | | |
|---|---|---|---|
| 6,545,604 B1 | 4/2003 | Dando et al. | |
| 7,256,699 B2 * | 8/2007 | Tethrake | G06K 19/041 340/10.1 |
| 7,591,628 B2 | 9/2009 | Noonan et al. | |
| 7,621,111 B2 | 11/2009 | Roberts | |
| 7,877,970 B1 | 2/2011 | Crosby | |
| 8,087,216 B2 | 1/2012 | Noonan et al. | |
| 8,258,952 B2 | 9/2012 | Hyde et al. | |
| 8,289,167 B2 * | 10/2012 | Bauchot | G01C 15/04 340/568.2 |
| 8,371,062 B2 * | 2/2013 | Ziegmann | A01M 23/24 43/61 |
| 8,407,157 B2 | 3/2013 | Anderson | |
| 8,516,954 B2 * | 8/2013 | Smith | A01F 15/08 100/2 |
| 8,531,300 B2 | 9/2013 | Foster et al. | |
| 8,870,078 B2 * | 10/2014 | Webb | G06K 19/04 235/375 |
| 8,947,205 B2 * | 2/2015 | Rushing | G01C 15/04 340/10.1 |
| 2002/0073915 A1 * | 6/2002 | Howard | G09F 19/22 116/209 |
| 2007/0240389 A1 | 10/2007 | Frerichs | |
| 2009/0108606 A1 * | 4/2009 | Noonan | A01D 87/127 294/104 |
| 2010/0054891 A1 | 3/2010 | Nishida et al. | |
| 2010/0251661 A1 | 10/2010 | Illgner et al. | |
| 2011/0213492 A1 * | 9/2011 | Lafferty | A01G 7/00 700/215 |
| 2012/0048129 A1 * | 3/2012 | Smith | A01F 15/08 100/2 |
| 2012/0098641 A1 * | 4/2012 | Whittle | G06K 19/041 340/10.1 |
| 2013/0305658 A1 * | 11/2013 | Smith | A01F 15/08 53/135.1 |
| 2013/0319263 A1 * | 12/2013 | Roberts | A01F 15/0825 100/43 |
| 2015/0310323 A1 * | 10/2015 | Foster | G06Q 50/02 56/341 |

* cited by examiner

SYSTEM AND METHOD FOR TRACKING AGRICULTURAL PRODUCT UNITS

CROSS REFERENCE TO RELATED APPLICATIONS

This application claims priority from and the benefit of U.S. Provisional Patent Application No. 61/983,376, entitled "SYSTEM AND METHOD FOR TRACKING AGRICULTURAL PRODUCT UNITS," filed Apr. 23, 2014, which is hereby incorporated by reference in its entirety.

BACKGROUND

The subject matter disclosed herein relates generally to agricultural systems and devices, and more particularly, to agricultural systems and methods for tracking units of agricultural products.

Generally, agricultural balers or packagers are utilized to compress certain agricultural products into rectangular or circular packages 24 to facilitate storage, transport, and handling of the material. Usually, the material is compressed within a packaging chamber until the material forms a bale of a desired size and density. In an ever evolving industry, providing certain data related to agricultural product harvesting may enable an increase in product quality control. Unfortunately, typical systems may rely on physically marking or labeling the agricultural product to convey data related to agricultural product harvesting, which may also render a portion of the agricultural product unusable. Additionally, such typical systems may convey a limited amount of data, and processes for marking the packages 24 and/or reading the labels may be inefficient.

BRIEF DESCRIPTION

In one embodiment, a system for tracking a harvested agricultural product unit includes a magazine configured to be disposed on an agricultural implement and to facilitate insertion of one or more stakes into the harvested agricultural product unit (e.g., harvested agricultural product package, harvested agricultural product bale, harvested agricultural product module). The magazine is also configured to store the one or more stakes having a radio frequency identification (RFID) tag. The RFID tag is configured to identify the harvested agricultural product unit and to associate the harvested agricultural product unit with harvesting data. Further, the system includes an insertion device configured to insert one of the stakes from the magazine into the harvested agricultural product unit.

In another embodiment, a method for tracking a harvested agricultural product unit includes storing a stake comprising a radio frequency identification (RFID) tag in a magazine that is configured to be coupled to the agricultural implement. Additionally, the method includes inserting the stake from the magazine into the harvested agricultural product unit using an insertion device that is configured to be coupled to the agricultural implement.

In a further embodiment, a radio frequency identification (RFID) device includes a stake insertable into a bale of an agricultural product. The stake includes a head portion and an insertion portion extending from the head portion. Further, the device includes a slot extending axially or laterally through the head portion of the stake, and an RFID tag is positioned within the slot.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to systems and methods for tracking and monitoring units of baled agricultural product (e.g., agricultural product units and compressed and/or packaged agricultural product), as well as for tracking and monitoring harvesting data related to units of the baled agricultural product. In particular, various devices may be provided in a baling system to assign identification information and/or harvesting data to a bale of the agricultural product prior to ejecting the bale or package from an agricultural baler or packager. For example, a stake including an RFID tag may be inserted into the bale for identification purposes and, in at least one embodiment, to store the harvesting data of the agricultural product in the bale locally on the RFID tag. The described embodiments may provide advantages over traditional baling systems and methods in that the stake enables efficient tracking of data, efficient insertion into and/or removal from the bale, and/or efficient identification and/or data reading at a processing center without physically marking or labeling the agricultural products, for example. In this manner, characteristics of the agricultural product may be monitored and tracked. For example, a processor of organic agricultural products may quickly and reliably track information about a farm and a growing method of a particular unit of the agricultural product to ensure that the product was grown organically.

Figure 1:
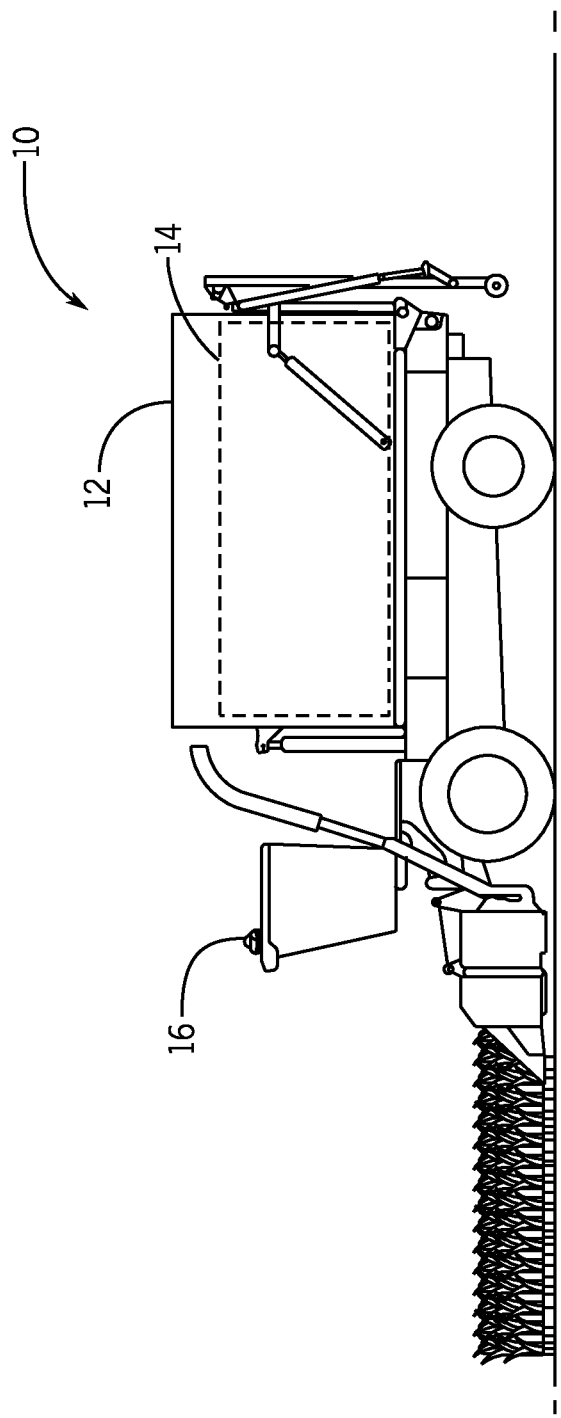
FIG. 1 is a side view of an embodiment of a self-contained agricultural implement including a packager.

FIG. 1 is a side view of an embodiment of a self-contained agricultural implement 10 including a packager 12 (e.g., baler or module builder). As illustrated, a packaging chamber 14 is supported and/or mounted within or on the self-contained agricultural implement 10. The packaging chamber 14 may compress agricultural products into square or round packages 24, and a strapping or tying mechanism may apply strap or twine to contain the packages 24. Further, the self-contained agricultural implement 10 may collect the agricultural products and/or form packages 24 as the self-contained agricultural implement 10 travels across the field. Additionally, the agricultural products baled in this manner by the packager 12 may include crop materials, such as hay, straw, grasses, silage, corn stalks, tobacco, cotton, biomass, etc. As discussed in more detail below, the packager 12 may include structural and control features that facilitate insertion of a stake having a radio frequency identification (RFID) tag into the bale to enable efficient tracking and monitoring of the bale and/or of harvesting data related to the bale.

In certain embodiments, the packager 12 may be supported and/or mounted within or on a towed agricultural implement. In such an example, the packager 12 may be part of a towed implement, which is coupled to a tow vehicle and pulled through the field, thereby enabling the packager 12 to collect and/or to bale the material as the towed implement travels through the field. As used herein, the term agricultural implement includes a wide variety of devices, including towed implements, self-propelled chassis, and self-contained vehicles.

Further, the agricultural implement 10, as illustrated in FIG. 1, includes an antenna 16 for collecting global positioning system (GPS) coordinates as the agricultural implement 10 traverses a field to collect agricultural products and bale the agricultural products into individual units. In this manner, the agricultural implement 10 may collect harvesting data relating to a location of harvesting and baling for specific agricultural product units.

Figure 2:
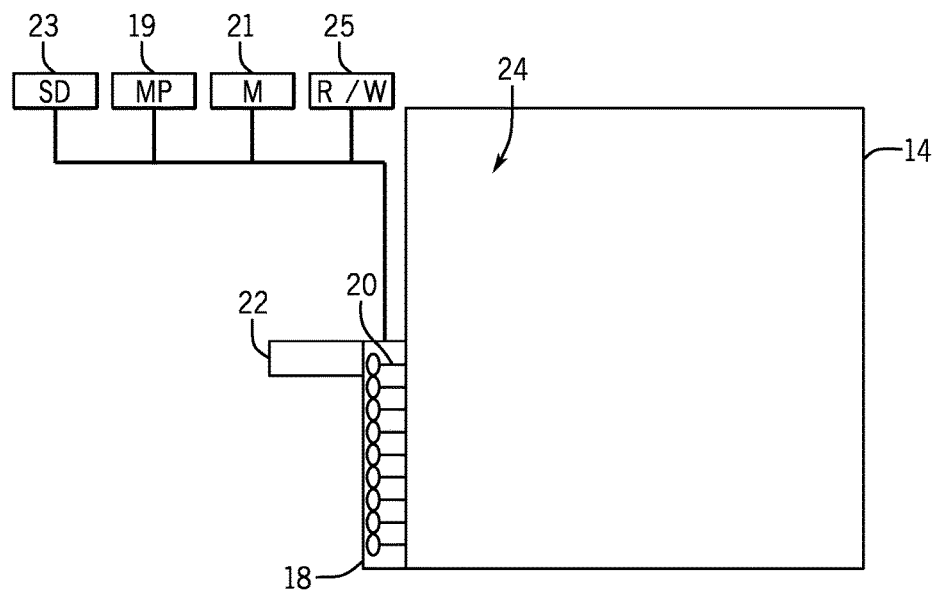
FIG. 2 is a schematic representation of the packager including a magazine and a stake insertion device.

FIG. 2 is a schematic representation of the packaging chamber 14 including a magazine 18 (e.g., a storage volume), which supports stakes 20, and a stake insertion device 22, which drives the stakes 20 into the bale of agricultural product. The magazine 18 may support or store any suitable number of stakes 20, such as 1, 10, 20, 30, 40, 50, or more stakes 20. As illustrated, the magazine 18 is coupled to a frame of the packaging chamber 14. The magazine 18 may be permanently affixed to the frame or may be removably coupled to the frame, which may facilitate replacement of the magazine 18, as discussed in more detail below. Upon forming a agricultural product package 24 (e.g., bale or module), a stake 20 may be inserted into the package 24 via the stake insertion device 22. The stake 20 may be inserted into the package 24 at any suitable time during the baling process, such as during or after compression of the agricultural product into the package 24, during or after containment (e.g., tying or strapping) of the package 24, during or prior to removal of the package 24 from the packaging chamber 14, for example. The stake insertion device 22 may be hydraulically actuated, pneumatically actuated, spring actuated, or actuated in any other manner sufficient to drive the stakes 20 into the package 24.

In the illustrated embodiment, the stakes 20 include radio frequency identification (RFID) tags to provide identification information and/or harvesting data of the agricultural product units in which the stakes 20 are implanted. In some embodiments, the RFID tags of the stakes 20 provide unique identification numbers to each of the agricultural product units. In these embodiments, the RFID tags may be read with an RFID scanner, which may provide power to the RFID tags with electro-magnetic waves, electro-magnetic fields, or radio waves, and the unique identification numbers may enable a user to to correlate harvest, crop, and logistical data of the individual agricultural product units within a remote harvesting data system that stores the harvesting data of the agricultural product units by looking up the unique identification numbers.

In the illustrated embodiment, the packager 12 may include processing components to facilitate tracking the package 24. For example, a microprocessor 19 may receive instructions from a memory 21 to read the unique identification number of the RFID tag of the stake 20 with an RFID tag reader/writer 25. In some embodiments, the RFID tag reader/writer 25 may be coupled to the packager 12 and may read the RFID tag of the stake 20 prior to, during, or after insertion of the stake 20 into the package 24. Upon reading the unique identification number, the microprocessor 19 may associate the unique identification number with the harvesting data stored in a storage device 23. Further, the storage device 23 may interact with the remote harvesting data system to provide the harvesting data to a central server for access, such as via any wireless connection, for example. In other embodiments, the RFID tags may be read/write RFID tags configured to store harvesting data locally to the agricultural product units in addition to the unique identification numbers. In such cases, the RFID tag reader/writer 25 may write the harvesting data to the RFID tag of the stake 20 in such a manner that the stake 20 may store the harvesting data locally. The RFID tag reader/writer 25 may write the harvesting data to the RFID tag of the stake 20 prior to, during, or after insertion of the stake 20 into the package 24. In some embodiments, the harvesting data may be written to the RFID tag prior to coupling the RFID tag to the packager 12 and/or the magazine 18. In such an embodiment, the read/write RFID tags may enable a user to download and display the harvesting data of the individual agricultural product units directly from the read/write RFID tags by scanning the read/write RFID tags with an RFID scanner.

Further, the harvesting data associated with the unique identification numbers or stored locally on the RFID tag may include farm names, harvesting location information, a global positioning system (GPS) coordinate of a harvesting location, agricultural product type, seed type, chemicals or fertilizers used, weight or mass of the package 24, event date and time stamps, yield data, average moisture content at the time of harvest, average yield, percent of protein of the agricultural product, agricultural product grade, area of a field from which the agricultural product unit was harvested, and any other measurable data that a farmer or agricultural product processor may deem useful. For example, an organic dairy farmer may wish to ensure that the farmer's dairy cattle feed is grown organically. With the ability to efficiently and reliably access data related to farming methods and farming locations via the RFID tag on the stake 20, the farmer may have reasonable certainty that the organic dairy farm is running on truly organic materials. In other applications, a cotton gin operator may wish to know what part of the country seed cotton comes from or even whether the farm from which the raw cotton originates generally grows a high quality crop. This type of information may be available to the cotton gin operator by scanning the RFID tag on the stake 20 that is coupled to a cotton module.

Additionally, the harvesting data may be written directly onto the RFID tag by an RFID writing device. In some embodiments, the unique identification number of the stake 20 may be read and assigned to the harvesting data associated with the package 24. In this manner, a memory device on the agricultural implement 10 may precisely assign unique harvesting data (e.g., the GPS coordinates) to each of the packages 24. The harvesting data may be written directly onto the RFID tag and/or the harvesting data may be assigned any suitable time during the baling process, such as prior to or after insertion of the stake 20 into the package 24, during collection of the agricultural product, during formation of the package 24, during containment (e.g., strapping) of the package 24, and/or as the package 24 is deposited into the field, for example.

As discussed above, the magazine 18 may be configured to store the stakes 20 for insertion into the package 24. The magazine 18 may bias the stakes 20 toward the stake insertion device 22 using a spring, or the magazine 18 may rely on gravity feeding the stakes 20 toward the stake insertion device 22. Upon exhausting a supply of the stakes 20 in the magazine 18, a full magazine 18 may replace the exhausted magazine 18 to continue a baling and staking process. In another embodiment, a farmer may continually feed the stakes 20 to the gravity-fed magazine 18 as supply decreases. Such an embodiment may eliminate a reloading process from one magazine 18 to another magazine 18.

Figure 3:
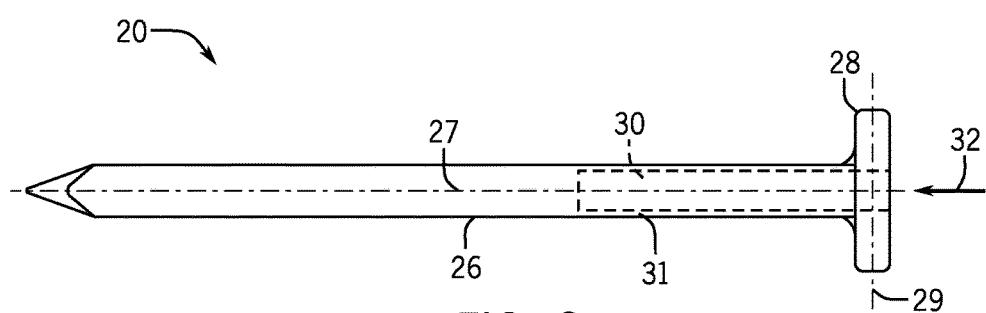
FIG. 3 is a cross-sectional view of an embodiment of a stake with a round head portion that has a circular cross-section.

FIG. 3 is a cross-sectional view of an embodiment of the stake 20 with a round head portion 28 that has a circular cross-section. In the illustrated embodiment, the stake 20 includes an insertion portion 26 extending from the head portion 28. The stake 20 may be described with reference to an axial axis or direction 27 and a lateral axis or direction 29. Further, the stake 20 may be between approximately 30 and 40 centimeters (cm), 33 and 38 cm, or 34 and 35 cm in length along the axial axis 27. The stake insertion device 22 may drive the insertion portion 26 of the stake 20 into the package 24 by applying pressure toward the package 24 on the head portion 28 of the stake 20.

Further, in the illustrated embodiment, the stake 20 includes a slot 30 to receive an RFID tag 31. The slot 30 may be formed via any suitable technique. For example, the slot 30 may be formed by a mold during manufacturing of the stake 20, or the slot 30 may be formed after the molding of the stake 20. Additionally, as illustrated, the slot 30 extends in the axial direction 27 from the head portion 28 into the insertion portion 26. In such a configuration, the RFID tag 31 may be inserted as shown by arrow 32 into the slot 30 via an opening in an outer surface of the head portion 28 of the stake 20.

Figure 4:
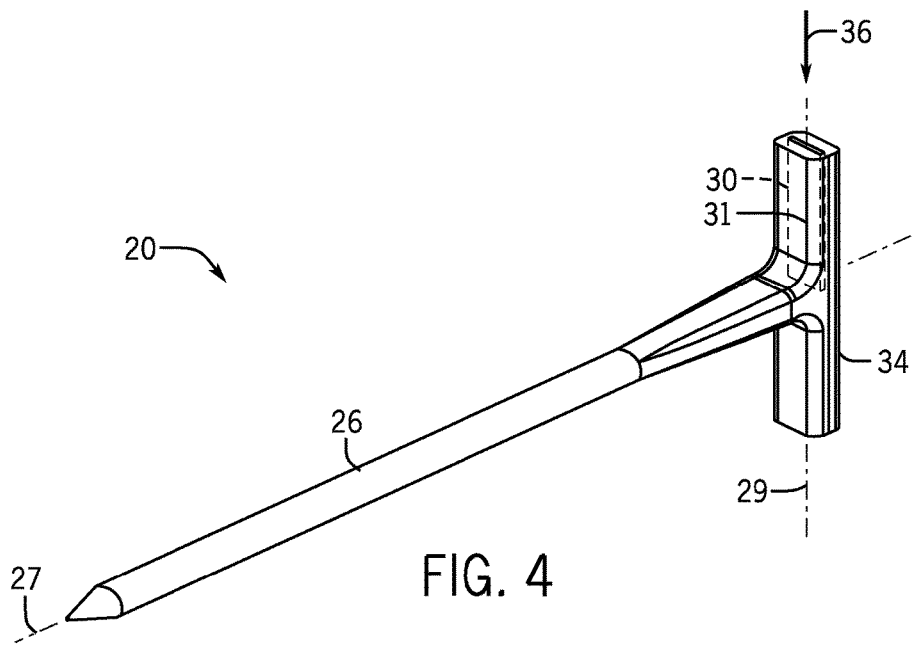
FIG. 4 is a perspective view of an embodiment of a stake with a bar head portion that has a generally rectangular cross-section.

FIG. 4 is a perspective view of an embodiment of the stake 20 with a bar head portion 34 that has a generally rectangular (e.g., elongated) cross-section. In the illustrated embodiment, the stake 20 includes the insertion portion 26 of FIG. 3, but also contains the bar head portion 34 that forms an elongated bar generally perpendicular to the insertion portion 26. In a similar manner to the embodiment of FIG. 3, the stake insertion device 22 may drive the insertion portion 26 of the stake 20 into the package 24 by applying pressure toward the package 24 on the bar head portion 34 of the stake 20.

Additionally, in the illustrated embodiment, the stake 20 includes the slot 30 to receive the RFID tag 31. The slot 30 is positioned proximate to an end of the bar head portion 34 and extends in the lateral direction 29 within the bar head portion 34. In this manner, the RFID tag 31 may be deposited as shown by arrow 36 into the slot 30 and may remain easily accessible (e.g., readable) from an outer side of the package 24 after insertion of the stake 20 into the package 24. Because the RFID tag 31 maintains a position proximate to the outer side of the package 24 in the illustrated configuration, the agricultural product may not interfere with the radio frequency signals on which the RFID tag 31 relies for operation.

Further, the geometry and configuration of the bar head portion 34 may enable easy and/or efficient removal of the stake 20 prior to processing the package 24. For example, a user may grasp the bar head portion 34 as a handle and pull away from the package 24 to remove the stake 20. The ease of removal may also enhance the reusability of the bar head configuration of the stake 20. For example, the user may effectively remove the stake 20 without the aid of a separate tool (e.g., a crowbar), and limit any wear to the stake 20 from the use of the separate tool.

Although the slot 30 is shown in certain positions in FIGS. 3 and 4 to facilitate discussion, it should be understood that the slot 30 may be positioned in any suitable location within the stake 20. For example, the slot 30 in the bar head portion 34 may extend in the axial direction 27 from the bar head portion 34 into the insertion portion 26, as illustrated in FIG. 3. Having the slot 30 and the RFID tag 31 in this position may provide greater protection for the RFID tag 31, while maintaining the easy removal characteristic of the bar head portion 34 configuration.

Additionally, the round head portion 28 configuration of the stake 20 may be fitted with a slot 30 extending in the lateral direction 29 within the head portion 28. Such an embodiment may be advantageous to increase access to and/or readability of the RFID tag 31 as the RFID tag 31 is positioned proximate to an outer side of the package 24. Thus, durability of the round head portion 28 configuration is maintained while improving a range for reading the RFID tag 31, for example.

Furthermore, as discussed above, the slots 30 of the stakes 20 may remain open (e.g., the slots 30 may have an opening at an outer surface of the stake 20) during a molding process to enable insertion and/or removal of the RFID tags 31 at a later time. Such embodiments may enable the stake 20 to receive a number of RFID tags 31 during a lifetime of the stake 20. Therefore, an operating lifespan of the stake 20 is not limited to an operating lifespan of the RFID tags 31.

On the other hand, in some embodiments, the RFID tags 31 may be embedded in the slots 30 during the manufacturing process and the slots 30 may be closed (e.g., by molding or by a covering) such that the slots 30 no longer have an open end (e.g., the slots 30 do not have an opening at an outer surface of the stake 20) and form a closed cavity. In this manner, the RFID tags 31 may be permanent fixtures within the stake 20. Such an embodiment may be particularly useful when the stakes 20 are used with non-writable RFID tags 31 used to assign the unique identification number associated with the harvesting data stored elsewhere to the package 24, for example.

The stake 20 may be formed from any suitable material. For example, the stake 20 may be molded from a single piece of polymeric material (e.g., plastic or nylon). This type of material may provide a cost-effective and sturdy material to mold the stake 20 and may also be relatively easy to insert and/or remove from the package 24. In contrast, some agricultural product units may be compressed to a density at which the stake 20 made from a polymeric material may not adequately penetrate the package 24. In such a situation, the insertion portion 26 may be made from a metal or metal alloy while the head portion 28, 34 is made from a polymeric material. The head portion 28, 34 may remain a polymeric material so as to avoid interference with the RFID tag 31, for example.

Figure 5:
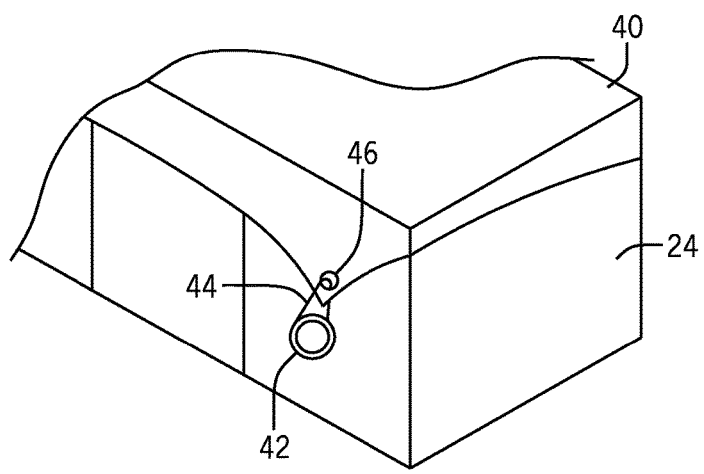
FIG. 5 is a perspective view of an embodiment of a ring head portion of a stake configured to facilitate coupling of a bale cover to a bale.

FIG. 5 is a perspective view of an embodiment of a ring head portion 42 of the stake 20 configured to facilitate coupling of a package cover 40 to the package 24 (e.g., tarping a cotton module). As shown, the package 24 is covered with the package cover 40, which may protect the package 24, and the package cover 40 is tied down (e.g., coupled to the package 24) via the ring head portion 42 of the stake 20. In the illustrated embodiment, the ring head portion 42 includes a grasping device (e.g., a ring or a hook) extending from the ring head portion 42. The hook or the ring of the head portion 42 may be advantageous as a grasping device similar to the bar head portion 34 configuration of FIG. 4. The ring or the hook may further provide an anchoring system to facilitate securement of the package cover 40 in place on the package 24. For example, in the illustrated embodiment, the ring head portion 42 provides the ring as an anchor to interact with and/or engage a tie-down 44. The tie-down 44 may also in turn interact with and/or engage an eyelet 46 of the package cover 40. In some embodiments, the ring of the ring head portion 42 may directly interact with and/or engage any suitable portion of the package cover 40, such as the eyelet 46 of the package cover 40. In this manner, the stake 20 may provide at least one anchoring point for the package cover 40.

Figure 6:
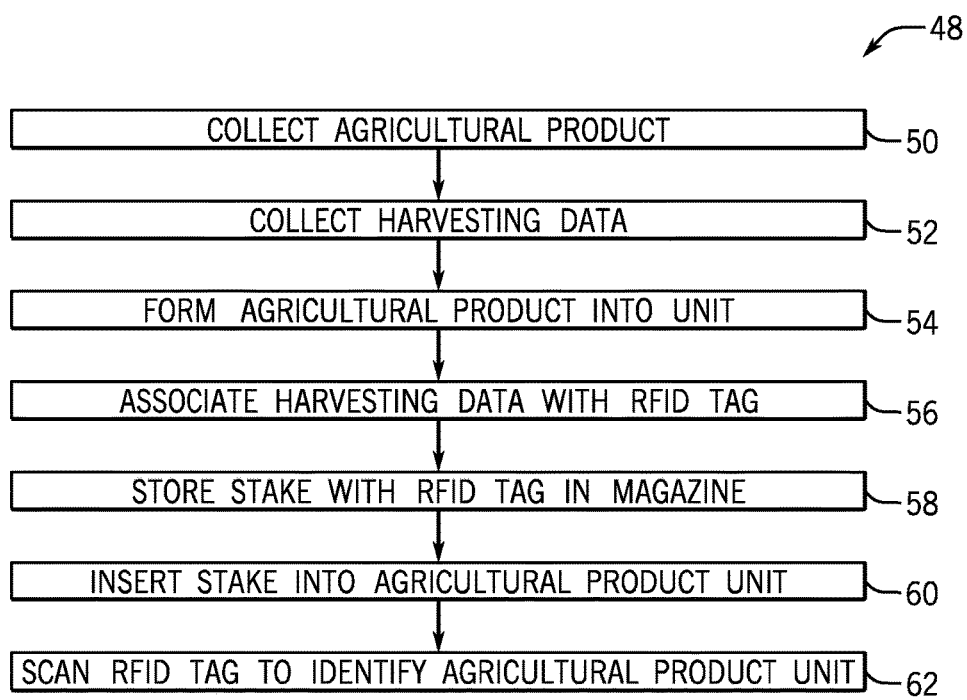
FIG. 6 is a flow diagram of an embodiment of a method for tracking agricultural product units.

FIG. 6 is a flow diagram of a method 48 for tracking agricultural product units. As discussed above, the agricultural implement 10 may collect the agricultural product at block 50. While the agricultural implement 10 collects the agricultural product at block 50, the agricultural implement 10 may also collect harvesting data at block 52. As discussed above, the harvesting data may include GPS coordinates, agricultural product type, seed type, chemicals or fertilizers used, date and time stamps, yield data, moisture content, area of a field from which the agricultural product unit was harvested, and any other measurable data that a farmer or agricultural product processor may deem useful. Further, the agricultural implement 10 may include a storage device 23 to store the harvesting data on the agricultural implement 10, and the storage device 23 may be configured to interact with the harvesting data system to allow access by a user to the harvesting data, such as from any wireless connection.

While the agricultural product is collected, the agricultural implement 10 may form the agricultural product into the agricultural product units (e.g., packages 24) at block 54. The agricultural implement 10 may form the agricultural product units by compressing the agricultural product and by applying strapping or twine, or any other suitable containment element, to contain the packages 24.

Additionally, at block 56, the harvesting data for an individual agricultural product unit may be associated with the RFID tag 31 within the stake 20. The harvesting data may be associated with the RFID tag 31 in any of the manners discussed above, for example. The stake 20 including the RFID tag 31 may also be stored in the magazine 18 prior to insertion of the stake 20 into the agricultural product unit. Upon associating the harvesting data with the RFID tag 31, the stake 20 may be inserted into the agricultural product unit at block 60. Inserting the stake 20 into the agricultural product unit may be accomplished using the stake insertion device 22, as discussed in greater detail above.

Once the agricultural product unit receives the stake 20, the harvesting data associated with the stake 20 may be available to the user by scanning the agricultural product unit with the RFID scanner at block 62. Scanning the agricultural product may provide the user seeking the harvesting data the unique identification number of the stake 20 to enable the user to look-up the harvesting data associated with the unique identification number from the harvesting data system. In another embodiment, the RFID tag 31 may be writable. In this embodiment, the RFID tag 31 may contain the harvesting data locally on the RFID tag 31 allowing the user to obtain the harvesting data directly on scanning the RFID tag 31 at block 62. It may be appreciated that while blocks 50 through 62 are listed in a particular order in the method 48 of FIG. 6, the blocks 50 through 62 may be carried out in any suitable order depending upon preferences of the user. Further, not all steps of the method 48 need be performed to accomplish the objectives of the subject matter disclosed herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for tracking a harvested agricultural product unit, comprising:
 a plurality of stakes insertable into the harvested agricultural product unit, wherein a first stake of the plurality of stakes comprises an insertion portion extending from a first end to a second end along an axial axis of the first stake and a head portion positioned at the first end of the insertion portion, and the head portion extends laterally outwardly from the insertion portion relative to the axial axis of the first stake and extends along a lateral axis that intersects the axial axis of the first stake, and wherein the first stake comprises a slot extending through the head portion of the first stake, a radio frequency identification (RFID) tag positioned within the slot in the head portion of the first stake, and the RFID tag is configured to identify the harvested agricultural product unit and to associate the harvested agricultural product unit with harvesting data;
 a magazine configured to be disposed on an agricultural implement, to store the plurality of stakes, and to facilitate insertion of one or more stakes of the plurality of stakes into the harvested agricultural product unit; and
 an insertion device configured to insert at least one of the plurality of stakes from the magazine into the harvested agricultural product unit.

2. The system of claim 1, wherein the agricultural implement is configured to form the harvested agricultural product unit, and wherein the harvested agricultural product unit comprises hay, straw, grasses, silage, corn stalks, tobacco, cotton, or biomass products.

3. The system of claim 1, wherein the harvesting data comprises farm names, harvesting location information, global positioning system (GPS) coordinates of a harvesting location, agricultural product type, seed type, chemicals or fertilizers used, event date and time stamps, weight or mass, average moisture at the time of harvest, average yield, percent of protein, product grade, or any combination thereof.

4. The system of claim 1, wherein at least one of the plurality of stakes is reusable with another RFID tag.

5. The system of claim 1, wherein the first stake comprises an opening formed in an outer surface of the stake to enable insertion of the RFID tag into the slot and removal of the RFID tag from the slot.

6. A method of using a radio frequency identification (RFID) device, comprising:
- inserting an RFID tag into a slot extending through a head portion of a stake via an opening formed in an outer surface of the stake, wherein the stake comprises an insertion portion extending from a first end to a second end along an axial axis of the stake and the head portion is positioned at the first end of the insertion portion, and the head portion extends laterally outwardly from the insertion portion relative to the axial axis of the stake and extends along a lateral axis that intersects the axial axis of the stake;
- positioning the stake supporting the RFID tag in a magazine configured to be disposed on an agricultural implement; and
- operating an insertion device to drive the stake from the magazine into a harvested agricultural product unit after the harvested agricultural product unit is formed into a bale.

7. The method of claim 6, wherein inserting the RFID tag into the slot comprises inserting the RFID tag through the opening formed in an axially-facing upper surface of the head portion of the stake and driving the RFID tag in a direction generally parallel to the axial axis.

8. The method of claim 6, comprising:
- removing the RFID tag from the slot via the opening after operating the insertion device to drive the stake from the magazine; and
- inserting another RFID tag into the slot via the opening after removing the RFID tag from the slot, thereby reusing the stake to support the another RFID tag.

* * * * *